United States Patent [19]
Armbruster et al.

[11] Patent Number: 5,809,396
[45] Date of Patent: *Sep. 15, 1998

[54] RADIO TELECOMMUNICATION NETWORK WITH SELECTABLE RING SIGNAL COVERAGE

[75] Inventors: Peter J. Armbruster, Tempe; Dean Paul Vanden Heuvel; James W. Bishop, Jr., both of Chandler, all of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 624,232

[22] Filed: Mar. 29, 1996

[51] Int. Cl.⁶ .............................. H04Q 7/20; H04B 7/185
[52] U.S. Cl. ..................... 455/12.1; 455/429; 455/441; 342/357
[58] Field of Search .................................. 455/12.1, 13.1, 455/13.2, 13.3, 33.1, 33.3, 54.1, 33.2, 33.4, 34.1, 56.1, 237.1, 422, 517, 429, 433; 342/352, 354, 357

[56] References Cited

U.S. PATENT DOCUMENTS

| | | | |
|---|---|---|---|
| 5,343,512 | 8/1994 | Wang et al. | 379/59 |
| 5,365,451 | 11/1994 | Wang et al. | 364/449 |
| 5,396,645 | 3/1995 | Huff | 455/33.4 |
| 5,438,609 | 8/1995 | Yahagi | 455/33.1 |
| 5,463,400 | 10/1995 | Tayloe | 342/352 |
| 5,465,388 | 11/1995 | Zicker | 455/422 |
| 5,594,947 | 1/1997 | Grube et al. | 455/56.1 |
| 5,619,209 | 4/1997 | Horstein et al. | 455/13.1 |
| 5,631,642 | 5/1997 | Brockelsby et al. | 340/993 |

*Primary Examiner*—Nguyen Vo
*Assistant Examiner*—Sam Bhattacharya
*Attorney, Agent, or Firm*—Gregory J. Gorrie

[57] ABSTRACT

A radio telecommunication network (10) includes satellites (12) which project cells (30) on the surface of the earth. Mobile units (16) are alerted to incoming calls when they receive ring signals. Ring signal coverage parameter values are selected in response to differentiating data (46) which cause different ring signals to be activated for mobile units (16) which appear to be proximately located. An illumination area ring signal coverage parameter may have a value selected in response to differentiating data (46) so that larger illumination areas are used for higher speed mobile units (16"). A transmission power ring signal coverage parameter may have a value selected in response to differentiating data (46) so that higher power ring signals are used in specific situations identified by the differentiating data (46).

17 Claims, 5 Drawing Sheets

RADIO TELECOMMUNICATION NETWORK WITH SELECTABLE RING SIGNAL COVERAGE

FIELD OF THE INVENTION

The present invention relates to radio telecommunication networks which vary ring signal coverage parameters in response to equipment and/or user identifying data.

BACKGROUND OF THE INVENTION

A system portion of cellular or other radio telecommunication networks often tracks the locations of the mobile subscriber units for which communication services are to be provided. The system activates a ring signal to alert a mobile unit to an incoming call. System resources can be conserved by activating the ring signal in only the illumination area where the mobile unit is located. In particular, the overall power consumed by the system in transmitting a ring signal is reduced when the ring signal is activated in fewer cells. This power consumption problem becomes particularly important in a satellite-based network. In addition, the number of incoming call or page alert messages that can be delivered using a given ring signal delivery capacity is increased when each ring signal is activated in fewer cells.

The network would benefit from maintaining current, accurate and precise location data for each mobile unit to which communication services are being provided. This type of location data would allow the system to narrowly focus the ring signal coverage on a minimum area. With this type of location data, the system could achieve the maximum conservation of system power and ring signal capacity resources while still achieving a good probability that the narrowly focused ring signal would be received by its intended mobile unit.

However, other system resources would be consumed to maintain current, accurate and precise location data for each mobile unit. In particular, an undesirably large amount of overhead communications would be required. To maintain current location data, the system might engage in a communication session with a mobile unit each time a mobile unit moves a small distance from the last location recorded by the system. Unfortunately, for a given amount of spectrum allocated to the network, these overhead communication sessions would prevent the network from conveying a corresponding amount of subscriber traffic. In other words, the network benefits from minimizing the number of such overhead communication sessions because minimizing overhead communication sessions maximizes the system capacity available for conveying subscriber traffic. But, minimizing the number of overhead communication sessions reduces the system's ability to accurately and precisely track mobile unit locations.

Accordingly, network resources are optimally conserved by balancing ring signal illumination area against overhead traffic communication volume. Unfortunately, conventional radio telecommunication networks strike a very crude balance between illumination area and overhead traffic communication volume. As a consequence, power consumption is undesirably high in many situations, and an undesirably high proportion of the allocated spectrum is used for overhead communication sessions in other situations.

In particular, conventional mobile units register with their system in accordance with a temporal re-registration schedule. Using a temporal schedule, slow moving mobile units waste precious overhead traffic capacity by informing the system of mobile unit locations that are little changed from previous locations. Conversely, a frequent call-in schedule must be adopted to accommodate fast moving mobile units, or else the fast moving mobile units are likely to move so far from known locations that ring signals activated in a limited area will not be received.

Other prior art mobile units register with their systems when they move out of a predetermined area. This technique improves upon temporal re-registration, but still fails to adequately compensate for differences between various types of mobile unit equipment and mobile unit users. For example, an optimum balance of illumination area against overhead traffic communications for faster moving mobile units is likely to differ from an optimum balance for slower moving or stationary mobile units. When a single illumination area is used for all proximately located mobile units, the illumination area is likely to be undesirably large for slower mobile units and undesirably small for faster moving mobile units. Thus, too much power is consumed ringing slower mobile units and too much overhead traffic communication is required to track faster moving mobile units.

Moreover, conventional prior art networks fail to adequately consider different user needs in configuring ring signals. For communication services to meet user expectations, all mobile units need to have a good probability of receiving ring signals activated in the areas where they reside. While this good probability of receiving a ring signal is adequate for the most users, certain VIP users and emergency service providers may need a higher probability of receiving their ring signals. The power consumption and equipment costs associated with improving this good probability to an excellent probability for all users are disproportionately high. Thus, conventional networks force all mobile unit users, including those involved in providing emergency services and VIP users, to experience the same good probability of receiving incoming calls as is provided for all other users.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE DRAWINGS

The following describes an improved radio telecommunication network with selectable ring signal coverage. Ring signal coverage corresponds to the likelihood of successfully paging a mobile unit. The size of an illumination area or the amount of ring signal penetration within a given illumination area may be selected. The network may differentiate between different types of mobile units and configure geographically distinct illumination areas for a given location in response to mobile unit type. The network may also differentiate between different types of mobile units and configure ring signal power level for a given location in response to mobile unit type. Different power levels achieve different degrees of ring signal penetration within a given illumination area. Further, the network may differentiate between different mobile unit users and select diverse illumination areas and/or ring signal power levels for a given location in response to user needs. By varying values for ring signal coverage parameters in response to mobile unit equipment type and/or user needs, the network conserves overall power consumption involved in delivering ring signals. In addition, the network conserves overall overhead traffic communications required for the system to track mobile units.

Figure 1:
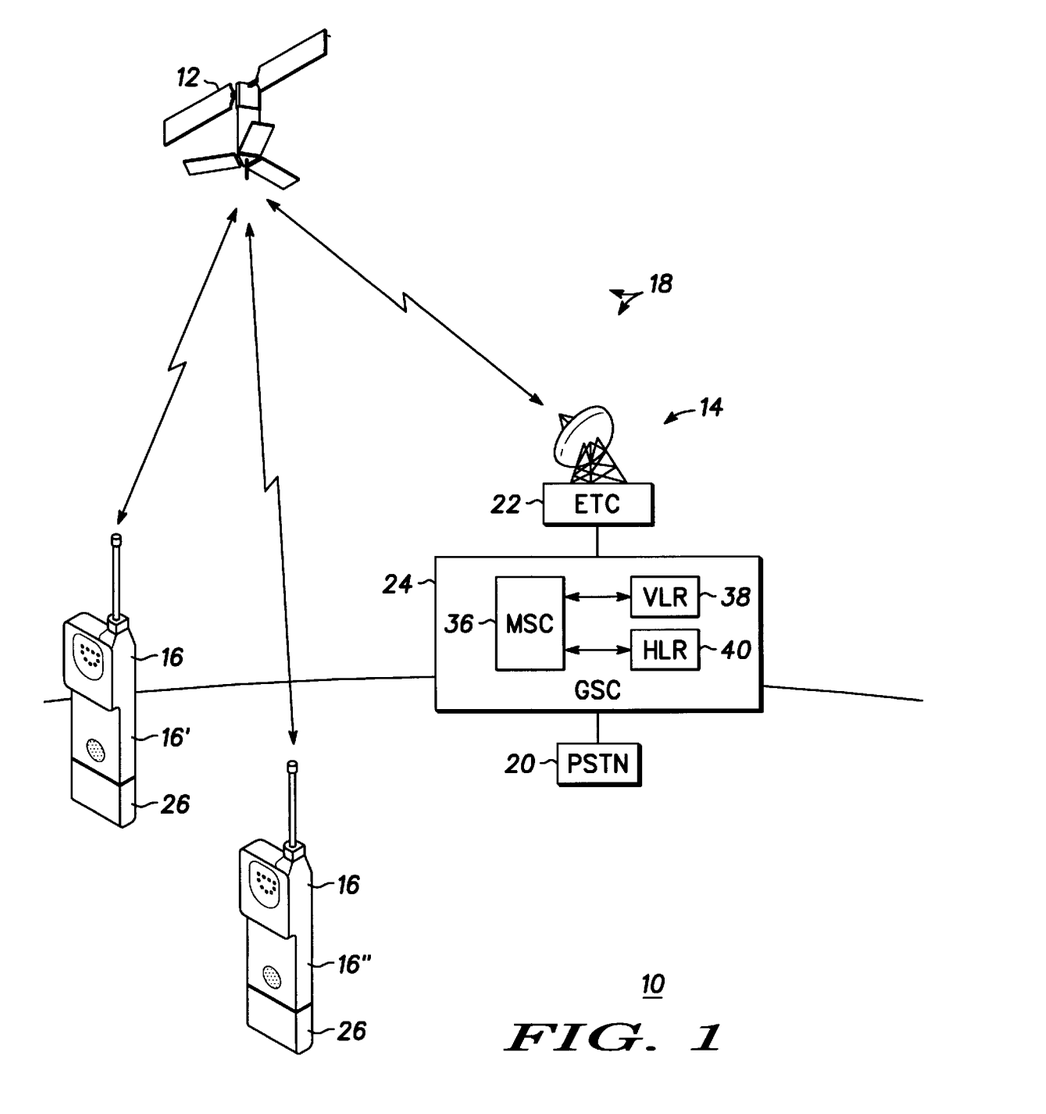
FIG. 1 shows a layout diagram of an environment within which a radio telecommunication network may operate.

FIG. 1 shows a layout diagram of an environment within which a radio telecommunication network 10 operates. In the preferred embodiment, network 10 includes satellites (SV) 12, gateways 14, and subscriber units, hereinafter referred to as mobile units 16. For purposes of this description, satellites 12 and gateways 14 are collectively referred to as a system 18. System 18 is provided by, maintained by, and controlled by communication service providers. Network 10 includes mobile units 16 and system 18. Mobile units 16 are controlled by mobile unit users.

Satellites 12 orbit the earth while gateways 14 and mobile units 16 reside on or near the earth's surface. Satellites 12 are or may be in radio communication with other satellites 12 (not shown) that are within range, with gateways 14 within range, and with mobile units 16 within range. As presently configured, sixty-six satellites 12 are arranged in a constellation of eleven, low earth, polar orbits, but this is not a requirement. FIG. 1 shows only one of satellites 12 for convenience.

Network 10 may include any number of gateways 14. However, network 10 may desirably deploy gateways 14 in accordance with geopolitical jurisdictions and include many fewer gateways 14 than mobile units 16. Network 10 may include any number, potentially in the millions, of mobile units 16. Mobile units 16 may be configured as conventional mobile or portable radio communication equipment, but a portion of mobile units 16 may also be configured as stationary equipment.

Gateways 14 couple network 10 to local public switched telecommunication networks (PSTNs) 20 and to a multitude of telephonic devices (not shown) through PSTNs 20. Each gateway 14 includes an earth terminal controller (ETC) 22 which directly communicates with satellites 12. A gateway switching center (GSC) 24 portion of gateway 14 couples to earth terminal controller 22, and to PSTN 20.

In the preferred embodiment of the present invention, each GSC 24 is similar to a conventional gateway switching center of the type used in the terrestrial-based Global System for Mobile telecommunications (GSM), with some modifications which are discussed below. GSCs 24 are involved in tracking movements of mobile units 16. When an incoming call is being directed to a mobile unit 16, a GSC 24 provides information which ETC 22 and satellite 12 use to select appropriate values for ring signal coverage parameters and transmit an appropriately configured ring signal. This information conveys the mobile unit's last known location and other differentiating data, such as mobile unit identity information and/or subscriber identity information.

In the presently preferred embodiment of the present invention, ETC 22 serves a role similar to that of a BSC in a conventional GSM network, except that ETC 22 communicates with and controls satellites 12 rather than the BTSs used in a GSM network. Unlike the GSM network, ETC 22 sets ring signal coverage parameter values in response to location and differentiating data provided by GSC 24. When location data indicate that two mobile units 16 are proximately located, ring signals directed to the two mobile units 16 may have different ring signal coverage parameter values determined in response to the differentiating data.

FIG. 1 illustrates two different types of mobile units 16 which may become proximately located from time to time. The different types are a low speed mobile unit (LS-MU) 16' and a high speed mobile unit (HS-MU) 16". LSMU 16' may be a conventional hand-held portable unit or a stationary unit. HS-MU 16" may be mounted in a fast moving train, airplane, or other vehicle which routinely travels long distances in relatively short time intervals. Of course, the various types of mobile units 16 may alternatively be classified into many more categories.

Each of LS-MU 16' and HS-MU 16" may include a subscriber identity module (SIM) or SIM card 26. SIM 26 removably couples to MUs 16. SIMs 26 are similar to SIM cards used in a conventional GSM network. Such cards include memory (not shown) in which user identity information is stored. In one embodiment of the present invention, the differentiating data upon which ring signal coverage parameter values are selected are stored in SIMs 26. For example, a digit of a user identity code, such as an international mobile subscriber identity (IMSI) may be coded to describe the type of mobile unit (i.e. whether a LS-MU 16' or an HS-MU 16") with which the associated SIM 26 is most likely to be used. By accessing this digit of the IMSI for a user to which an incoming call is being directed, system 18 may learn of the type of mobile unit 16 which is likely to receive the ring signal. In another embodiment, mobile units 16 directly communicate equipment IDs or equipment type codes to GSCs 24 during registration so that such equipment data are available at GSCs 24 when incoming calls occur.

Figure 2:
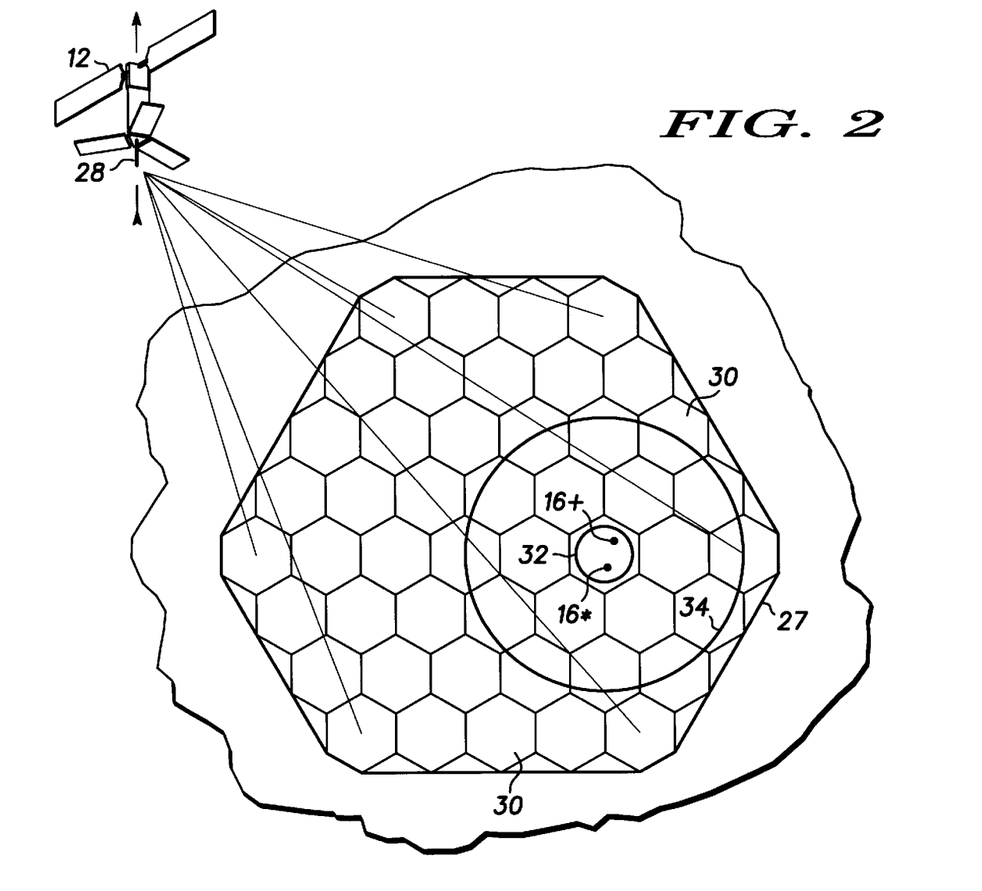
FIG. 2 shows a cellular pattern formed on the surface of the earth by a satellite portion of the network.

FIG. 2 shows a cellular footprint pattern 27 formed on the surface of the earth by a single satellite 12. Each satellite 12 includes an array 28 of directional antennas. Each array 28 projects numerous discrete antenna patterns on the earth's surface at numerous diverse angles away from its satellite 12. FIG. 2 shows a diagram of a resulting pattern of cells 30 that a satellite 12 forms on the surface of the earth. Desirably, other satellites 12 (not shown) form other footprints (not shown) so that cells 30 substantially cover the entire surface of the earth.

For convenience, FIG. 2 illustrates cells 30 and footprint pattern 27 as being discrete, generally hexagonal shapes without overlap or gaps. However, those skilled in the art will understand that in actual practice equal strength lines projected from the antennas of satellites 12 may actually have a shape far different than a hexagonal shape, that antenna side lobes may distort the pattern, that some cells 30 may cover larger areas than other cells 30, and that some overlap between adjacent cells may be expected.

Satellite 12 serves as a transmission facility which transmits ring signals to mobile units 16. By way of example, FIG. 2 shows two mobile units 16+ and 16* that appear to system 18 (see FIG. 1) to be proximately located. In addition, FIG. 2 shows a small illumination area 32 and a geographically distinct large illumination area 34. Illumination areas 32 and 34 are roughly centered around the apparent locations for mobile units 16+ and 16*. FIG. 2 illustrates illumination areas 32 and 34 as being circles, but other shapes may be also used.

A ring signal may be activated in small illumination area 32 by transmitting the ring signal only in a single cell 30. Alternatively, the ring signal may be activated in large illumination area 34 by transmitting the ring signal in nineteen of cells 30. More power is consumed in activating the ring signal in large illumination area 34 than in small illumination area 32. On the other hand, if system 18 has imprecise data regarding the actual locations of mobile units 16+and 16*, system 18 is more likely to successfully reach mobile units 16+or 16* by using large illumination area 34 rather than small illumination area 32.

Based on equipment type differentiating data, for example, system 18 may conclude that mobile unit 16+is an HS-MU 16" (see FIG. 1) and that mobile unit 16* is an LS-MU 16' (see FIG. 1). As a result of this determination, system 18 may configure an illumination area coverage parameter to indicate large illumination area 34 for incoming calls being directed to HS-MU 16+and configure the parameter to indicate small illumination area 32 for incoming calls being directed to LS-MU 16*. HS-MU 16+would then be permitted to travel a great distance before being forced to re-register, and overhead traffic communications would be conserved. Likewise, the ring signal would be delivered to LS-MU 16* using a minimum amount of power.

In an alternate embodiment, based on user or equipment differentiating data, for example, system 18 may conclude that mobile unit 16+has been placed in a typical service-use where a good probability of receiving the ring signal is sufficient. On the other hand, system 18 may conclude that mobile unit 16* has been placed in an emergency or other type of service-use which dictates an excellent probability for receiving the ring signal. Based upon differentiating data, system 18 identifies these diverse situations and configures an illumination area coverage parameter accordingly. In particular, system 18 may configure a ring signal transmission power level at a higher level for mobile unit 16* than for mobile unit 16+. This higher level may be applied within either small illumination area 32 or large illumination area 34.

Referring back to FIG. 1, GSC 24 includes a mobile switching center (MSC) 36 which couples to a visiting location register (VLR) 38 and to a home location register (HLR) 40. With exceptions discussed below, MSC 36, VLR 38, and HLR 40 serve roles in network 10 which are similar to roles served by their counterparts in conventional GSM networks.

Figure 3:
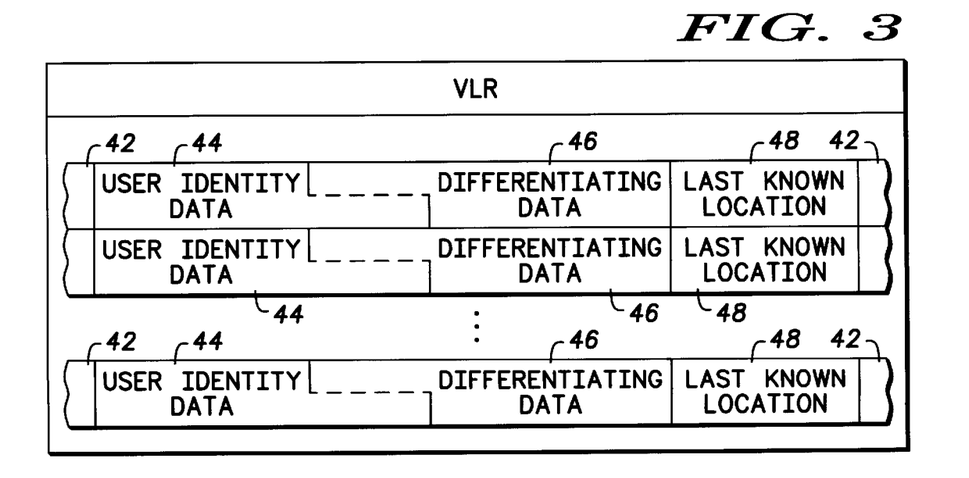
FIG. 3 shows a block diagram of data included in a visitor location register (VLR) memory component included in a gateway switching center (GSC) portion of the network.

FIG. 3 shows a block diagram of data stored in VLR 38. VLR 38 includes a record 42 of associated data elements for each user receiving communication services. As a user moves throughout the coverage area of network 10, VLRs 38 of different gateways 14 form a record 42 for the user. Records may, but are not required to be, indexed by temporary mobile subscriber identity (TMSI) codes which are assigned when a user enters the jurisdiction of a gateway 14.

User identity data 44 are included among the many data elements which may be included in each record 42. User identity data 44 uniquely identify the user of a mobile unit 16 and may also be configured for compatibility with an international mobile subscriber identity code (IMSI). As discussed above, a portion of user identity data 44, such as a digit, may be encoded to serve as differentiating data 46. This form of differentiating data 46 identifies a type of mobile unit 16. In an alternate embodiment, data which describe the user rather than the user's mobile unit 16 may serve as differentiating data 46, or data which uniquely identify specific mobile units 16 rather than types or categories of mobile units 16 may serve as differentiating data 46. Nothing prevents differentiating data 46 from also serving as user identity data 44 and vice versa.

VLR 38 additionally associates a last known location 48 with data or data elements 44 and 46 for each user. Last known location 48 serves a role similar to a local area code (LAC) for conventional GSM networks. Generally, location 48 indicates the geolocation from which the subscriber last registered. However, location 48 may identify an area or region rather than a precise point, and the actual location is likely to change soon after registration due to user movement. Those skilled in the art will appreciate that many additional data elements which are not important to the present invention may also be included in each VLR record 42.

Figure 4:
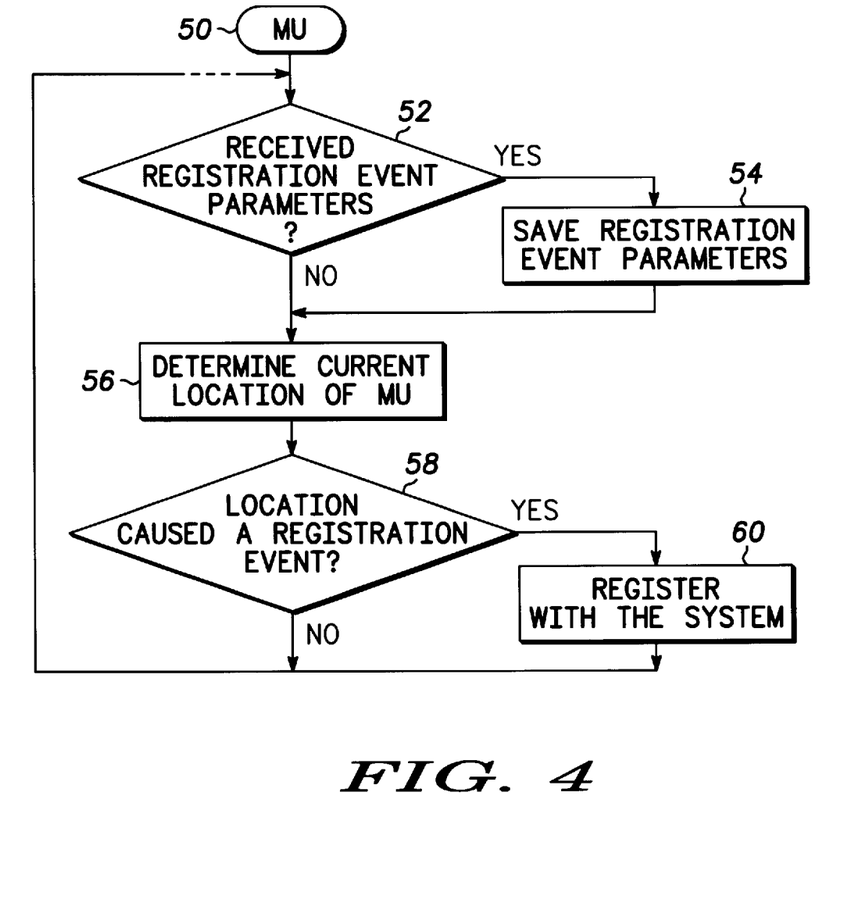
FIG. 4 shows a flow chart of a process performed by a mobile unit (MU) portion of the network.

FIG. 4 shows a flow chart of a process 50 performed by a mobile unit 16. Any number of mobile units 16, whether high speed, low speed, typical service-use, emergency service-use, or the like, may independently perform process 50. Specifically, any two mobile units 16 which may reside near one another may each perform their own versions of process 50. In general, process 50 causes the mobile unit 16 to register with system 18 when a registration event occurs. During registration, system 18 updates its last known location 48 data element in VLR 38 (see FIG. 3) for the subscriber.

Process 50 includes a query task 52 which determines whether registration event parameter values have been received. Registration event parameters define the conditions which cause mobile unit 16 to register with system 18. In the preferred embodiment, registration event parameters include a distance parameter. When a mobile unit 16 has moved a specified distance from the location at which it last registered, a registration event is declared. The distance value may vary from location to location and from mobile unit 16 to mobile unit 16. For example, a low speed mobile unit (LS-MU) 16' may receive a smaller distance value than a high speed mobile unit (HS-MU) 16" (see FIG. 1) even though they are proximately located. These distance values may correspond to the radii of illumination areas 32 and 34, respectively (see FIG. 2). In addition, two LS-MUs 16' may receive different distance values when they are remotely located from one another. The parameter values may be received via a prior registration communication session or via broadcast communications conveyed over a pilot channel from satellite 12 (see FIG. 1).

Alternate or additional registration event parameters may be used. As one example of an additional registration event parameter, a mobile unit 16 may automatically determine when a new or different SIM 26 (see FIG. 1) is coupled to the mobile unit and declare this event to be a registration event. Thus, ring signal coverage parameter values may reflect associations of users with equipment. As another example of an additional registration event parameter, a mobile unit 16 may automatically declare a registration event whenever a user attempts to make an outgoing call. Accordingly, system 18 will know precisely where a mobile unit 16 is located when an outgoing call is attempted.

When task 52 determines that registration event parameters are being received, a task 54 saves the parameters in a memory of mobile unit 16. After task 54 or when task 52 determines that no registration event parameter has been recently received, a task 56 determines the current location of the mobile unit (MU) 16. Any of a wide variety of location determination processes may be employed in task 56. For example, an external location determination system, such as one that relies upon the Global Positioning System (GPS), may be used. Alternatively, mobile unit 16 may calculate its own location by monitoring broadcast transmissions from satellites 12 as they move overhead.

After task 56, a query task 58 determines whether the location determined above in task 54 causes a registration event. For example, task 58 may determine whether mobile unit 16 has moved the distance recorded above in task 54 since it last registered. When a registration event is detected in task 58, a task 60 causes mobile unit 16 to register with system 18. Registration occurs by engaging in an overhead communication session with system 18. During this session, the location of mobile unit 16 may, but need not, be determined more accurately than occurred above in task 56. This location is communicated to a nearby gateway 14, where it is used to update the last known location data element 48 (see FIG. 3) for the user's VLR record 42. This location is also recorded in mobile unit 16.

System 18 may also qualify communication services based upon this location. For example, further services may be denied if the location resides in a geopolitical jurisdiction where communication services are not being provided, and rate schedules and tariffs to be used in providing future services may be selected in response to the location.

After task 60 or when task 58 determines that the current location for mobile unit 16 does not cause a registration event, program control loops back to task 52. However, as indicated by ellipsis in FIG. 4, process 50 may include any number of additional tasks. Such additional tasks may include monitoring for events which indicate the initiation of an incoming or outgoing call and responding to user inputs.

Figure 5:
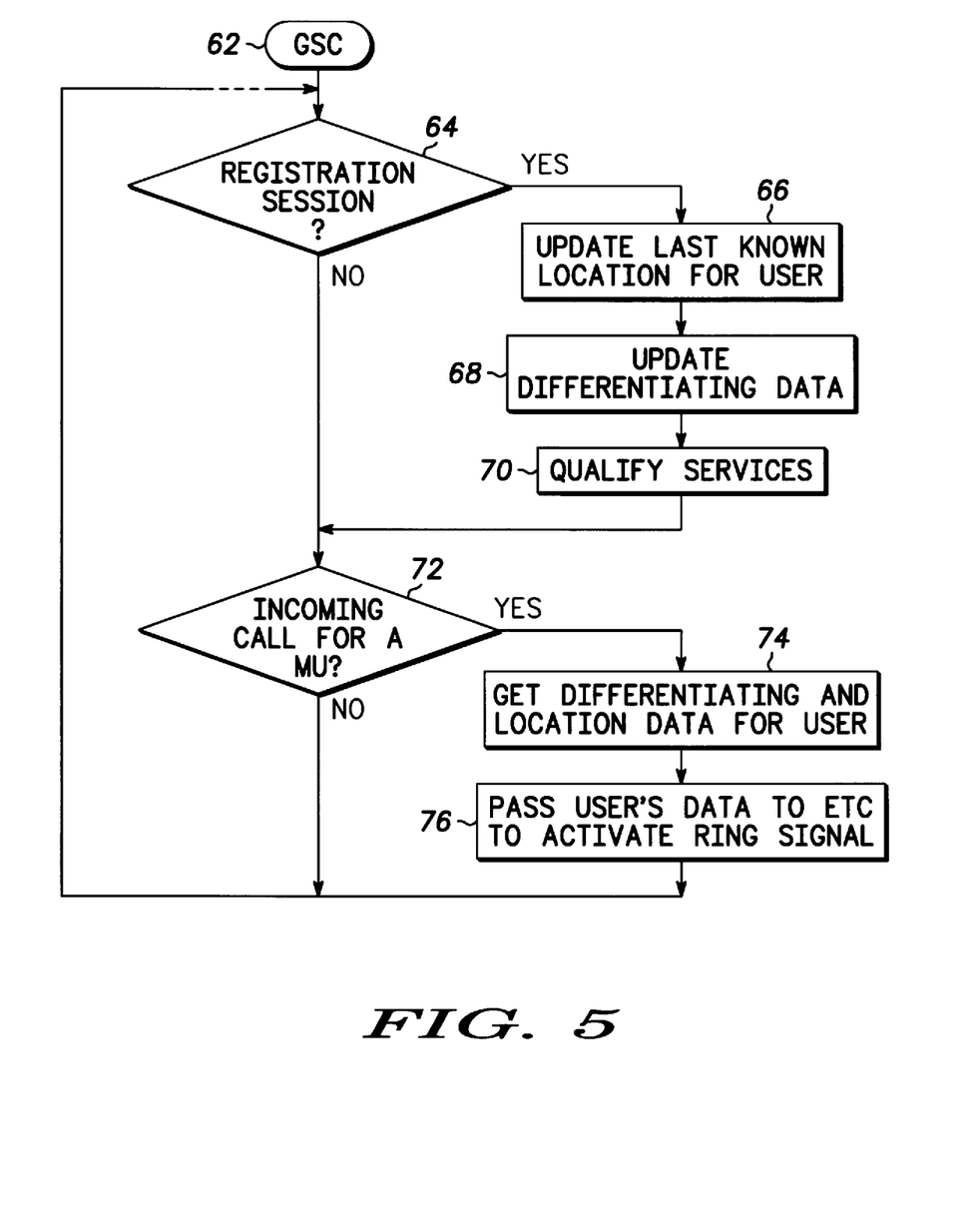
FIG. 5 shows a flow chart of a process performed by the gateway switching center (GSC)

FIG. 5 shows a flow chart of a process 62 performed by gateway switching center (GSC) 24. Each GSC 24 may independently perform process 62. In general, process 62 handles mobile unit registrations and processes incoming calls being directed to mobile units within the domain of GSC 24.

Process 62 includes a query task 64 which determines whether a registration session is taking place with a mobile unit 16. If a registration session is taking place, a task 66 updates the last known location 48 (see FIG. 3) in the subscriber's record 42 of VLR 38 in response to location data calculated or otherwise obtained during the registration. Next, an optional task 68 updates any differentiating data 46 (see FIG. 3) which may be conveyed during the registration communication session. Task 68 is optional because nothing requires the registration communication session to actually convey differentiating data 46. However, differentiating data 46 which characterize the mobile unit 16, such as an equipment ID, electronic serial number, or the like may be conveyed. If such data are conveyed, then task 68 updates the differentiating data 46 which are saved in association with user identity data 44 in the subscriber's record 42 of VLR 38. After task 68, a task 70 qualifies services to the mobile unit based, at least in part, upon the location discovered during the registration. Service qualification may include the denial of services or the selection of rate schedules in response to mobile unit location.

After task 70 or when task 64 determines that no registration session is taking place, a query task 72 determines whether an incoming call intended for a mobile unit (MU) 16 user within the jurisdiction of GSC 24 has been detected. An incoming call is detected in response to a message or other signal from PSTN 20 (see FIG. 1) or from other nodes of system 18. When an incoming call is detected, a task 74 gets differentiating data 46 and the last known location 48 for the called user. Next, a task 76 passes this data to earth terminal controller (ETC) 22 in a data communication so that an appropriately configured ring signal will be activated. The communication may additionally include user identity information, such as a temporary mobile subscriber identity (TMSI) code, which indicates which mobile unit 16 is the intended recipient of the incoming call.

After task 76 or when task 72 determines that no incoming call has been detected, program control loops back to task 64. However, as indicated by ellipsis in FIG. 5, process 62 may include any number of additional tasks.

Figure 6:
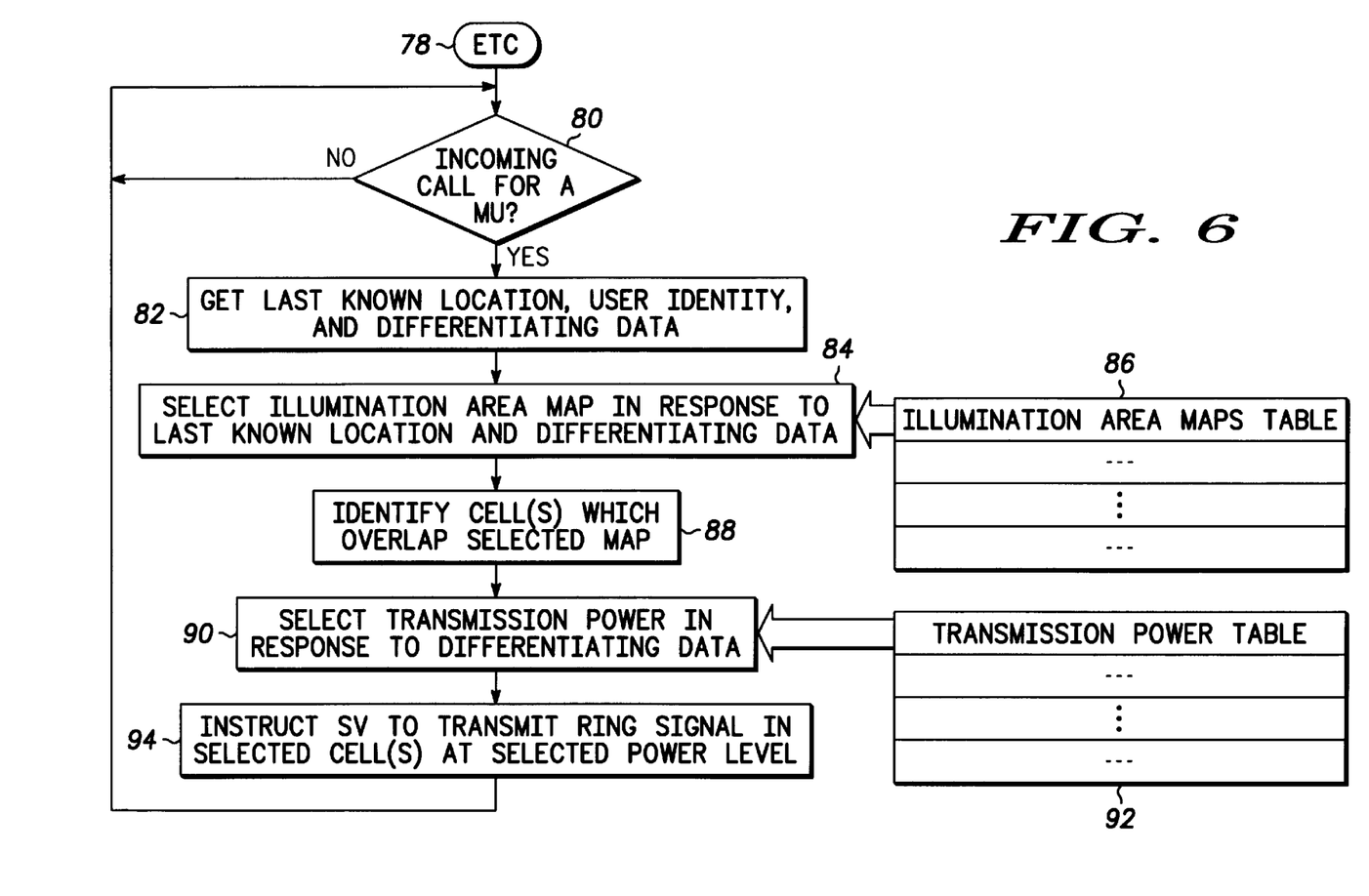
FIG. 6 shows a flow chart of a process performed by an earth terminal controller (ETC) portion of the network.

FIG. 6 shows a flow chart of a process 78 performed by earth terminal controller (ETC) 22. In general, process 78 selects appropriate ring signal coverage parameter values to use in activating a ring signal which will alert a mobile unit 16 to an incoming call.

Process 78 includes a query task 80 which determines whether instructions have been received indicating that an incoming call is being directed to a mobile unit (MU) 16 user. Such instructions result from GSC 24 performing task 76 (see FIG. 5). When incoming call instructions are received, a task 82 gets the last known location, differentiating data, and other data conveyed with the instructions. Next, a task 84 selects an illumination area map in response to the last known location and differentiating data. The illumination area represents one ring signal coverage parameter. The map represents a description of the area for which the ring signal will be activated.

Task 84 may select the map from a table 86 of illumination area maps stored in a memory portion of ETC 22. Table 86 includes any number of entries corresponding to any number of maps. Each map represents a geographically distinct area. FIG. 2 graphically illustrates two of such maps in small and large illumination areas 32 and 34. Differentiating data and last known location together indicate the appropriate map. When mobile units 16 are proximately located so that they have substantially the same last known location, differentiating data variations may force the selection of different maps. For example, differentiating data which identify a high speed mobile unit (HS-MU) 16" (see FIG. 1) dictate the selection of a map for large illumination area 34 (see FIG. 2) while differentiating data which identify a low speed mobile unit (LS-MU) 16' (see FIG. 1) dictate the selection of a map for small illumination area 32 (see FIG. 2) even though high speed and low speed mobile units 16" and 16' are proximately located.

After task 84, a task 88 identifies the cells 30 (see FIG. 2) which overlap the selected map at the current moment. Task 88 may be performed using a database (not shown) which defines the movement of cells 30 over the surface of the earth in response to movement of satellites 12 in their orbits around the earth. As discussed above in connection with the example presented in FIG. 2, only a single cell 30 is identified when small illumination area 32 is selected, but nineteen different cells 30 are identified when large illumination area 34 is selected.

After task 88, a task 90 selects transmission power in response to the differentiating data. Transmission power represents another ring signal coverage parameter. Task 90 may make its selection by examining a transmission power table 92 which has entries for a variety of differentiating data. For example, unusually high transmission power levels may be established for certain VIPs or emergency service-use applications. Unusually low transmission power levels may be established for stationary mobile units which may have substantially unobstructed views of satellite 12 and high gain antennas.

After task 90, a task 94 passes a data communication to one or more satellites (SV) 12. The data communication instructs the satellites 12 to transmit the ring signal in the cells 30 selected above in task 88 at the power levels selected above in task 90. In response to task 94, satellites 12 activate the ring signal in accordance with these instructions.

After task 94 or when task 80 fails to detect an incoming call for a mobile unit 16, program control loops back to task 80. However, as indicated by ellipsis in FIG. 6, process 78 may include any number of additional tasks. For example, additional tasks may be included to handle registrations, outgoing calls from mobile units 16, ongoing calls, and network system control. When task 80 detects another incoming call being directed to another mobile unit 16, the program flow loop which includes tasks 82, 84, 88, 90, and 94 is performed again. Even though this second mobile unit 16 may be proximately located to the mobile unit to which the previous incoming call was directed, different ring signal coverage may result due to the operation of process 78.

In summary, the present invention provides an improved radio telecommunication network with selectable ring signal coverage. The network may differentiate between different types of mobile units and configure geographically distinct illumination areas for a given location in response to mobile unit type. The network may also differentiate between different types of mobile units and configure ring signal power level for a given location in response to mobile unit type. Further, the network may differentiate between different mobile unit users and select diverse illumination areas and/or ring signal power levels for a given location in response to user needs. Overall power consumption involved in delivering ring signals is conserved, and the overhead traffic communications required for the system to track mobile units is also conserved.

The present invention has been described above with reference to preferred embodiments. However, those skilled in the art will recognize that changes and modifications may be made in these preferred embodiments without departing from the scope of the present invention. For example, the processes and tasks identified herein may be categorized and organized differently than described while achieving substantially equivalent results. These and other changes and modifications which are obvious to those skilled in the art are intended to be included within the scope of the present invention.

What is claimed is:

1. A method for alerting first and second proximately located mobile units to incoming calls, said method comprising the steps of:
    obtaining first and second differentiating data which characterize said first and second mobile units, respectively, wherein said first and second differentiating data including respectively a first and second mobility factor which correspond to respective first and second relative speeds at which said respective first and second mobile units may travel, said first and second mobile units including a removable subscriber identity module (SIM) having said respective first and second mobility factors stored thereon;
    detecting first and second incoming calls, said first and second incoming calls being intended for said first and second mobile units, respectively;
    activating a first ring signal in a first set of cells in response to said first incoming call, said first ring signal having a signal coverage parameter value chosen in response to said first differentiating data;
    activating a second ring signal in a second set of cells in response to said second incoming call, said second ring signal having said signal coverage parameter value chosen in response to said second differentiating data,
    wherein said first and second ring signal activating steps activate said first and second ring signals in first and second geographically distinct illumination areas, respectively,
    registering said first mobile unit when said first mobile unit moves outside said first geographically distinct illumination area; and
    registering said second mobile unit when said second mobile unit moves outside said second geographically distinct illumination area,
    wherein said second set of cells has more cells than said first set of cells when said second differentiating data indicates that said second mobile unit has a greater mobility factor than said first mobile unit, and
    wherein said second set of cells has less cells than said first set of cells when said second differentiating data indicates that said second mobile unit has a lesser mobility factor than said first mobile unit.

2. A method as claimed in claim 1 wherein said first and second differentiating data identify respectively said first and second mobile units as either a regular service mobile unit or an emergency service mobile unit, wherein said emergency service mobile unit has a larger geographically distinct illumination area than said regular service mobile unit, said larger geographically distinct illumination area having more cells for activating a ring alert signal than an illumination area for said regular service mobile unit.

3. A method as claimed in claim 1 wherein said first differentiating data identify said first mobile unit as a low speed mobile unit, and said second differentiating data identify said second mobile unit as a high speed mobile unit.

4. A method as claimed in claim 1 wherein each cell is substantially geographically distinct from other cells.

5. A method as claimed in claim 3 wherein:
    said first and second differentiating data are associated with first and second subscriber identifying data, respectively, said first and second subscriber identifying data including said respective mobility factors; and
    said method additionally comprises the step of storing said first and second differentiating data in association with said first and second subscriber identifying data on first and second subscriber identity modules, respectively, said first and second subscriber identity modules being removably coupled to said first and second mobile units, respectively.

6. A method as claimed in claim 3 wherein said first ring signal activating step and said second ring signal activating step are performed at a satellite which is in orbit around the earth.

7. A method for alerting first and second proximately located mobile units to incoming calls, said method comprising the steps of:
    obtaining first and second differentiating data which characterize said first and second mobile units, respectively, wherein said first and second differentiating data correspond to first and second relative speeds at which said first and second mobile units may travel;
    detecting first and second incoming calls, said first and second incoming calls being intended for said first and second mobile units, respectively;
    activating a first ring signal in response to said first incoming call, said first ring signal having a signal coverage parameter value chosen in response to said first differentiating data;

activating a second ring signal in response to said second incoming call, said second ring signal having said signal coverage parameter value chosen in response to said second differentiating data, wherein said first and second ring signal activating steps activate said first and second ring signals in first and second geographically distinct illumination areas, respectively, registering said first mobile unit when said first mobile unit moves outside said first geographically distinct illumination area; and registering said second mobile unit when said second mobile unit moves outside said second geographically distinct illumination area, and wherein said first differentiating data identify said first mobile unit as a low speed mobile unit, and said second differentiating data identify said second mobile unit as a high speed mobile unit, and wherein said second geographically distinct illumination area is larger than said first geographically distinct illumination area, the size of said geographically distinct illumination area being responsive to the respective signal coverage parameter, and wherein the activating a first ring signal step includes the step of activating said first ring alert signal in a first plurality of cells, and wherein the activating a second ring signal step includes the step of activating said second ring alert signal in a second plurality of cells, said second plurality of cells having more cells than said first plurality of cells, said cells being defined by separate antenna beams.

8. A method for alerting first and second proximately located mobile units to incoming calls, said method comprising the steps of:

obtaining first and second equipment identifying data which include a mobility factor for said first and second mobile units, respectively;

selecting, in response to said mobility factor included with said first equipment identifying data, a first set of cells in which said first mobile unit is likely to reside;

selecting, in response to said mobility factor included with said second equipment identifying data a second set of cells which differs from said first set of cells and in which said second mobile unit is likely to reside;

activating a first ring signal substantially throughout said first set of cells;

activating a second ring signal substantially throughout said second set of cells;

registering said first mobile unit when said first mobile unit moves outside said first set of cells; and registering said second mobile unit when said second mobile unit moves outside said second set of cells, wherein said first and second equipment identifying data are configured to correspond to first and second relative speeds at which said first and second mobile units may travel, and wherein said second set of cells has more cells than said first set of cells when said mobility factor included within said second equipment identifying data corresponds to a greater relative speed that said second mobile unit may travel than said first mobile unit, and wherein said second set of cells has less cells than said first set of cells when said mobility factor included within said second equipment identifying data corresponds to a lesser relative speed that said second mobile unit may travel than said first mobile unit.

9. A method as claimed in claim 8 wherein said first and second differentiating data respectively identify said first and second mobile units as either a regular service mobile unit or an emergency service mobile unit, emergency service mobile units having a larger geographically distinct illumination area than regular service mobile units and wherein said emergency service mobile unit has a larger geographically distinct illumination area than said regular service mobile unit, said larger geographically distinct illumination area having more cells for activating a ring alert signal than an illumination area for said regular service mobile unit.

10. A method as claimed in claim 9 wherein:

said first and second equipment identifying data are associated with first and second subscriber identifying data, respectively, said first and second subscriber identifying data including said respective mobility factors; and said method additionally comprises the step of storing said first and second equipment identifying data in association with said first and second subscriber identifying data on first and second subscriber identity modules, respectively, said first and second subscriber identity modules being removably coupled to said first and second mobile units, respectively.

11. A method as claimed in claim 8 wherein said first and second equipment identifying data identify said first mobile unit as a low speed mobile unit, and said second differentiating data identify said second mobile unit as a high speed mobile unit, said second geographically distinct illumination area having more cells than said first geographically distinct illumination area, the number of cells within said geographically distinct illumination area being responsive to the respective signal coverage parameter, and wherein each cell is substantially geographically distinct from other cells.

12. A method for alerting first and second proximately located mobile units to incoming calls, said method comprising the steps of:

obtaining first and second equipment identifying data which describe said first and second mobile units, respectively;

selecting, in response to said first equipment identifying data, a first illumination area in which said first mobile unit is likely to reside;

selecting, in response to said second equipment identifying data a second illumination area which differs from said first illumination area and in which said second mobile unit is likely to reside;

activating a first ring signal substantially throughout said first illumination area;

activating a second ring signal substantially throughout said second illumination area;

registering said first mobile unit when said first mobile unit moves outside said first illumination area; and registering said second mobile unit when said second mobile unit moves outside said second illumination area, wherein said first and second equipment identifying data are configured to correspond to first and second relative speeds at which said first and second mobile units may travel, and wherein said first and second equipment identifying data identify said first mobile unit as a low speed mobile unit, and said second differentiating data identify said second mobile unit as a high speed mobile unit, said second geographically distinct illumination area being larger than said first geographically distinct illumination area, the size of said geographically distinct illumination area being responsive to the respective signal coverage parameter, and wherein said first ring signal activating step and said second ring signal activating step are performed at a satellite which is in orbit around the earth, wherein the activating a first ring signal step includes the step of activating said first ring alert signal in a first plurality of cells, and wherein the activating a second ring signal step includes the step of activating said second ring alert signal in a second plurality of cells, said second plurality of cells having more cells than said first plurality of cells, said cells being defined by separate antenna beams provided by said satellite.

13. A radio telecommunication system which adapts ring signals used to alert first and second proximately located mobile units to incoming calls, said system comprising:

first and second data storage elements for storing first and second differentiating data which characterize said first and second mobile units, respectively, said first and second differentiating data corresponding to first and second relative speeds at which said first and second mobile units may travel;

a switching center, in data communication with said first and second data storage elements, said switching center being configured to detect first and second incoming calls, said first and second incoming calls being intended for said first and second mobile units, respectively; and a ring signal transmission facility in data communication with said switching center, said ring signal transmission facility being configured to activate a first ring signal in a first set of cells in response to said first incoming call, said first ring signal having a first signal coverage parameter value chosen in response to said first differentiating data, said first signal coverage parameter defining the number of cells in said first set, and said ring signal transmission facility being configured to activate a second ring signal in a second set of cells in response to said second incoming call, said second ring signal having a second signal coverage parameter value chosen in response to said second differentiating data, said second signal coverage parameter defining the number of cells in said second set, and wherein said second set of cells is has more cells than said first set of cells when said second differentiating data indicates that said second mobile unit has a greater mobility factor than said first mobile unit, and wherein said second set of cells has less cells than said first set of cells when said second differentiating data indicates that said second mobile unit has a lesser mobility factor than said first mobile unit.

14. A radio telecommunication system as claimed in claim 13 wherein said first and second differentiating data identify respectively, said first and second mobile units as either a regular service mobile unit or an emergency service mobile unit and wherein said emergency service mobile unit has a larger geographically distinct illumination area than said regular service mobile unit, said larger geographically distinct illumination area having more cells for activating a ring alert signal by said ring transmission facility than an illumination area for said regular service mobile unit.

15. A radio telecommunication system as claimed in claim 13 wherein each cell is substantially geographically distinct from other cells.

16. A radio telecommunication system which adapts ring signals used to alert first and second proximately located mobile units to incoming calls, said system comprising:

first and second data storage elements for storing first and second differentiating data which characterize said first and second mobile units, respectively, said first and second differentiating data corresponding to first and second relative speeds at which said first and second mobile units may travel;

a switching center, in data communication with said first and second data storage elements, said switching center being configured to detect first and second incoming calls, said first and second incoming calls being intended for said first and second mobile units, respectively; and a ring signal transmission facility in data communication with said switching center, said ring signal transmission facility being configured to activate a first ring signal in response to said first incoming call, said first ring signal having a signal coverage parameter value chosen in response to said first differentiating data, and said ring signal transmission facility being configured to activate a second ring signal in response to said second incoming call, said second ring signal having said signal coverage parameter value chosen in response to said second differentiating data wherein said first differentiating data identify said first mobile unit as a low speed mobile unit, and said second differentiating data identify said second mobile unit as a high speed mobile unit, and wherein:

said ring signal transmission facility is configured so that said first and second ring signals are broadcast to first and second geographically distinct illumination areas, respectively; and said first and second geographically distinct illumination areas are selected in response to said first and second differentiating data, respectively, and wherein said second geographically distinct illumination area is larger than said first geographically distinct illumination area, and wherein said ring signal transmission facility comprises a satellite which is orbiting the earth and wherein the a first ring signal is activated in a first plurality of cells, and wherein the second ring alert signal is activated in a second plurality of cells, said second plurality of cells having more cells than said first plurality of cells, said cells being defined by separate antenna beams provided by said satellite.

17. A method for alerting a mobile unit to incoming calls, said method comprising the steps of:

obtaining equipment identifying data which include a mobility factor for said mobile unit, said mobility factor corresponding to the speed at which said mobile unit may travel, said mobile unit including a removable subscriber identity module (SIM) having said mobility factor stored thereon;

selecting, in response to said mobility factor, a set of cells in which said mobile unit is likely to reside, wherein the number of cells in said set is determined at least in part by said mobility factor, each cell of said set having a substantially geographically distinct illumination area from other cells of said set;

activating a ring signal directed to said mobile unit substantially throughout said set of cells;

registering said mobile unit when said mobile unit moves outside said set of cells; and wherein said selecting step, the number of cells selected is greater for higher mobility factors, and the number of cells selected is lower for lower mobility factors.

* * * * *